W. OLCOTT.
CORN CREAMER.
APPLICATION FILED SEPT. 14, 1921.
1,401,635.
Patented Dec. 27, 1921.
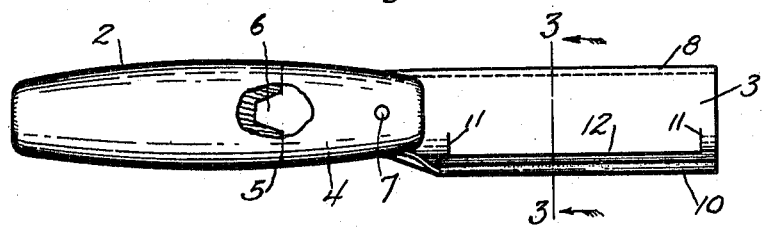
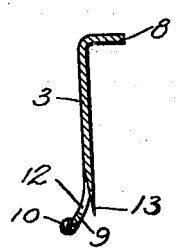
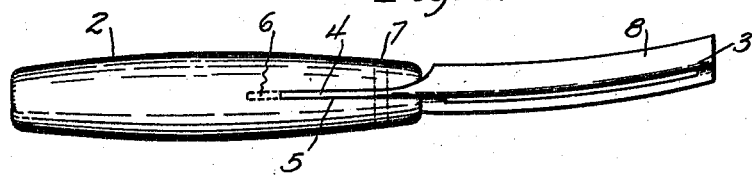
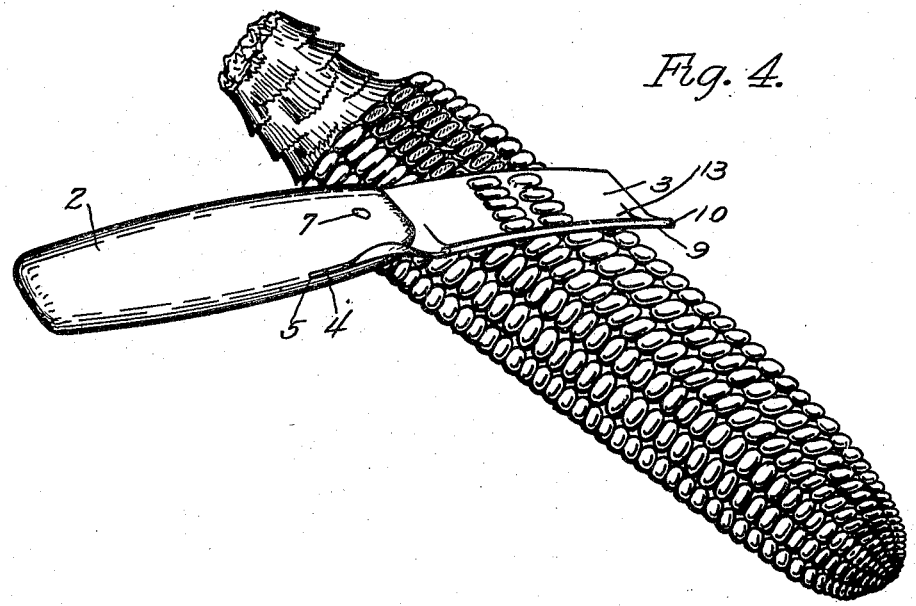
INVENTOR.
Walter Olcott
BY
ATTORNEY.

UNITED STATES PATENT OFFICE.

WALTER OLCOTT, OF SOUTH MANCHESTER, CONNECTICUT.

CORN-CREAMER.

1,401,635.  Specification of Letters Patent.  Patented Dec. 27, 1921.

Application filed September 14, 1921. Serial No. 500,614.

*To all whom it may concern:*

Be it known that I, WALTER OLCOTT, a citizen of the United States, residing at South Manchester, in the county of Hartford and State of Connecticut, have invented certain new and useful Improvements in Corn-Creamers, of which the following is a specification.

This invention relates to a green-corn scraper, the object of the invention being to provide means of a simple and inexpensive nature by which the corn can be thoroughly, cleanly, and easily scraped or cut from a cob. In Letters Patent No. 1,345,456, issued to me on July 6, 1920, I have shown, described, and claimed an article which thoroughly removes the pulp of corn. The motive of the present implement is to remove the kernels and their skins so that when a cob has been scraped it will be free of all edible substance.

In the drawings accompanying and forming part of the present specification I have shown in detail one of the several forms of embodiment of the invention which will be hereinafter fully set forth. Clearly I am not restricted to this disclosure. I may depart therefrom in a number of respects within the scope of the invention defined by the claims following said description.

Referring to said drawings:

Figure 1 is a top plan view of a green-corn scraper involving the invention, a portion of the handle being broken out to show the tang construction.

Fig. 2 is a side elevation of the article.

Fig. 3 is a transverse section on the line 3—3 of Fig. 1.

Fig. 4 is a perspective view showing a way of using the implement.

Like characters refer to like parts throughout the several figures of the drawing.

The device involves in its makeup a suitable handle 2 which is made from some proper material. I have found wood as best adapted for my purpose and I therefore prefer to utilize it. The article also includes a blade member such as that denoted in a general way by 3 and which I prefer to make in one piece from sheet steel although as with the handle this may not always be necessary nor is it vital that it be in one piece though this is the preferable form. The body of the blade member is ordinarily in elevation, of practically rectangular form and is provided at its rear end with a tang 4 which is connected in some proper manner with the handle. Usually the forward end of the handle has in it the longitudinal kerf or slit 5 into which I prefer to drive the tang, the tang at its rear end and practically centrally thereof having a blunt spur 6 which is driven into the stock of the handle 2 until the back edge of the tang 4 is bottomed in the kerf. For additional security I rivet as at 7 the tang 4 to the handle 2 the rivet passing through the handle and the tang and naturally being headed at its opposite ends. This provides a very simple and effective way of securely connecting the blade with the handle.

The blade member 2 desirably is both longitudinally and transversely curved to better enable it to conform to the shape of the ear of corn. It has along its back side edge the pendent flange 8 the rear and narrower portion of which is adapted to engage against the side face of the handle 2 near the front end thereof the under edge of this flange is longitudinally curved or concaved to better adapt the same to the form of the cob along which the implement is drawn. The blade 3 has its forward side portion up-curved as at 9 the back end of the up-curved portion bearing against the side of the handle 2 opposite the back end of the flange 8. For strength the blade may be provided with a bead 10 extending along the outer edge of the up-turned portion 9 and slightly along the front and rear ends of the blade. This appreciably strengthens the blade.

The blade member 3 has at one side of the longitudinal medium line thereof, the transverse slits 11 and the longitudinal slit 12 the stock within said slits being bent downward to present a cutting member 13 the front edge of this cutting member being beveled so as to present a cutting edge.

It will be assumed that it is desired to use the implement and that the user is right handed. In this event the following procedure will be adopted: The cob of green-corn will be held in the left hand and the handle 2 in the right at which point the blade 3 will be placed against the cob of corn and then drawn along it. The cutting member acting against the kernels on the cob as the tool is advanced cuts the tops of the kernels from the cob following which the pendent flange behind the blade or cutting member 13, scrapes or removes the cut portion and the pulp. The same action will be afterward repeated on a series of rows of kernels.

What I claim is:

1. An implement of the class described comprising a handle, and a blade member connected with the handle, having transverse slits and a longitudinal slit connecting the transverse slits, the stock formed by the slitting of the blade member being bent therefrom to present a cutting blade, the blade member back of the cutting blade having a scraping portion.

2. An implement of the class described comprising a handle and a blade member connected with the handle the blade member being transversely and longitudinally slit and the stock of the blade member within the slits being pressed downwardly from the blade member to present a cutting blade the inner side of the blade member being bent upward and the rear side downward.

In testimony whereof I affix my signature.

WALTER OLCOTT.

In presence of—
 HEATH SUTHERLAND,
 ELIZABETH A. BANNING.